Figure 1:
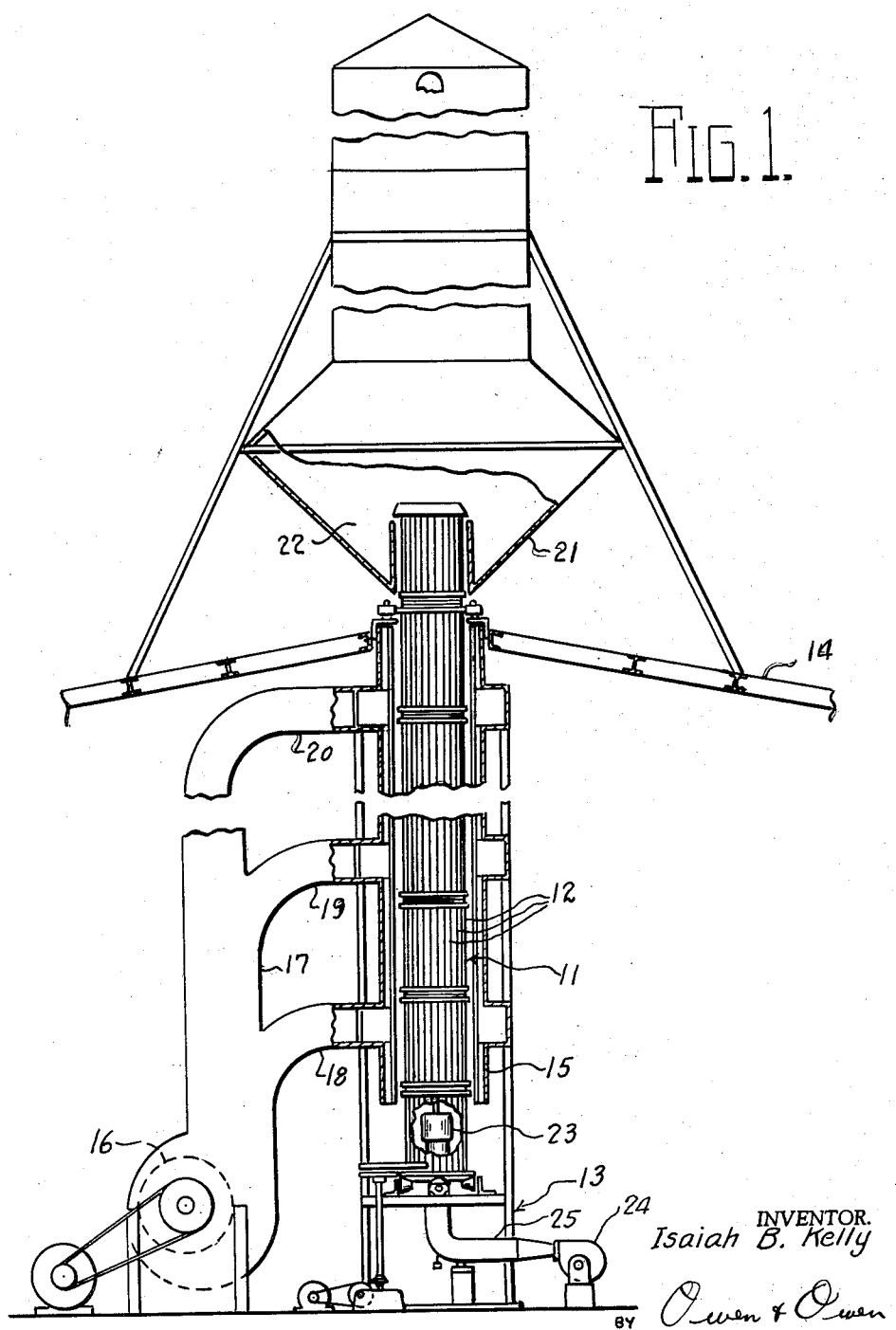

Sept. 9, 1958             I. B. KELLY             2,850,845

PRODUCTION OF GLASS BEADS

Filed Aug. 15, 1956             2 Sheets—Sheet 1

INVENTOR.
Isaiah B. Kelly

BY Owen & Owen

ATTORNEYS

Sept. 9, 1958      I. B. KELLY      2,850,845
PRODUCTION OF GLASS BEADS
Filed Aug. 15, 1956      2 Sheets-Sheet 2
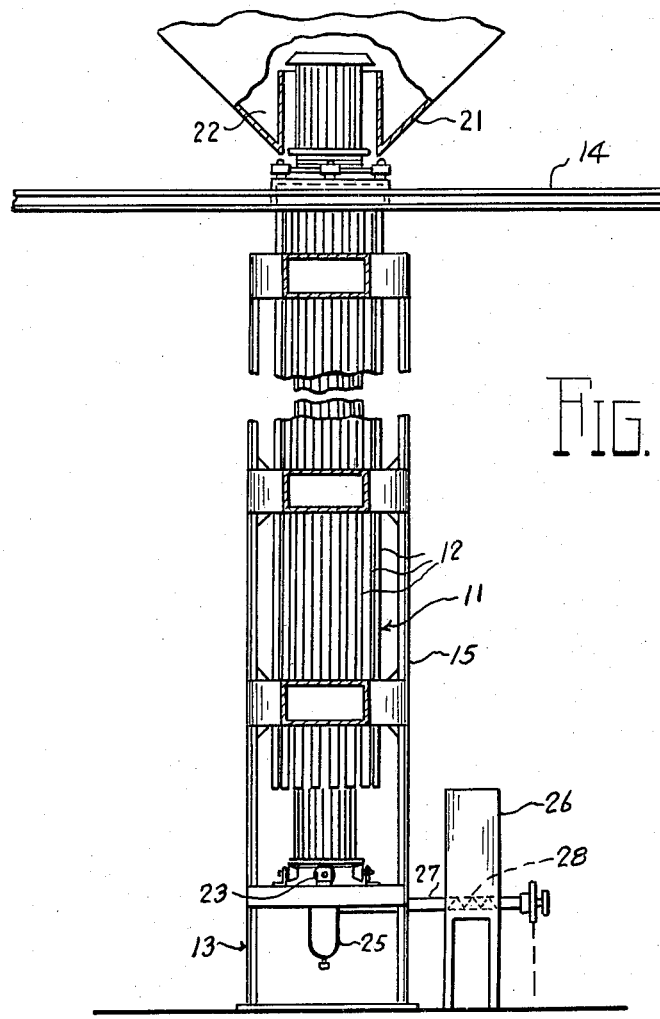
INVENTOR.
Isaiah B. Kelly
BY Owen & Owen
ATTORNEYS

United States Patent Office 2,850,845
Patented Sept. 9, 1958

2,850,845

PRODUCTION OF GLASS BEADS

Isaiah B. Kelly, Jackson, Miss., assignor to Cataphote Corporation, Toledo, Ohio, a corporation of Ohio Application August 15, 1956, Serial No. 604,077

7 Claims. (Cl. 49—84)

This invention relates to the production of glass beads, and, more particularly, to a method for the production thereof from a mixture of borax and irregularly shaped glass bodies.

The use of glass beads in reflex reflector markings for highways, highway signs, curbs, and the like, has been suggested. During relatively recent years the use of highway markings embodying the reflex reflection principle has become increasingly popular with State, county and even municipal highway departments. It has been found that such markings not only increase night visibility, but, also, that the presence of the glass beads markedly increases the life of the lines. Such lines have been produced by painting desired markings and then dropping glass beads into the paint while still wet, and have also been produced by application of a paint containing the beads. Particularly in the production of such markings by the former technique, substantial difficulty has been encountered because glass beads have a tendency to stick together after exposure to a relatively humid atmosphere. No completely successful manner has been found for avoiding the clogging due to such sticking of machines designed for application of the beads. The use of silicon-coated beads is suggested in U. S. Patent 2,730,841. Silicone-coated beads are not wet by water to any appreciable extent, and constitute a relatively satisfactory way to overcome sticking, from the standpoint of the ultimate user, but silanes and silane derivatives are expensive products, so that the cost of silicone-coated beads is comparatively high. Also, silicone-coated beads are likely not to adhere well to paint.

The present invention is based upon the discovery that such inexpensive materials as borax and related products can be used in a particular manner in the production of glass beads to produce, on the finished material, what appears to be a surface coating that is non-hygroscopic and, therefore, prevents sticking.

It is, therefore, an object of the invention to provide an improved method for producing glass beads.

It is a further object of the invention to provide glass beads which are non-hygroscopic and, therefore, do not stick even after extended periods of storage under highly humid conditions.

Other objects and advantages will be apparent from the description which follows reference being had to the accompanying drawings, in which:

Fig. 1 is a side elevation of an apparatus in which the method of the invention can be practiced, with parts broken away, and some parts shown in central vertical section; and Fig. 2 is a different side elevation of a stack portion of the apparatus of Fig. 1, taken at right angles to the view of Fig. 1.

According to the invention an improved method for producing glass beads is provided. Such improved method comprises introducing an intimate admixture of irregular shapes of powdered glass and a reaction product of an alkali metal compound and a boron acid into a stream of gases containing oxygen and a combustible compound, and moving at a velocity sufficient that the glass is carried by the gases into a combustion zone where the combustible compound is burned, the glass is fused and assumes a generally spherical shape, the reaction product is absorbed by the surfaces of the glass spheres, and from which products of combustion carry the surface modified spheroidized glass into a settling zone of greater diameter than the combustion zone, and discharging products of combustion from the settling zone.

Borax is an entirely satisfactory reaction product of an alkali metal compound and a boron acid for use in accordance with the invention. It is believed that other sodium tetraborates, for example $Na_2B_4O_7$ and $Na_2B_4O_7 \cdot 5H_2O$ can be used in place of borax, which is the decahydrate of sodium tetraborate ($Na_2B_4O_7 \cdot 10H_2O$). It is believed that sodium metaborates, for example $Na_2B_2O_4$ and $NaH_2BO_3 \cdot H_2O$, as well as sodium perborates, for example $NaBO_3 \cdot H_2O$ and $NaBO_3 \cdot 4H_2O$ can likewise be employed in place of borax. It is also believed that the corresponding compounds of alkali metals other than sodium could be employed with like effects, but economic considerations make their general use unfeasible at the present time.

Using borax as the reaction product of an alkali metal compound and a boron acid, optimum results have been achieved when the amount thereof employed has been from about 8 percent to about 10 percent of the weight of glass cullet. Beads produced in conventional bead forming apparatus from mixtures of borax and soda lime cullet, in such proportions, have been subjected to an atmosphere of 80 percent relative humidity at about 90° F. for fourteen days without losing their hydrophobic surface characteristics. In general, it has been found that excessive amounts of borax are undesirable because such material, when present in an unduly high proportion, tends to form small opaque white beads which have very little mechanical strength. Accordingly, while up to about 15 percent of borax can be employed, if desired for a particular purpose, it is usually preferred to use from about 8 percent to about 10 percent thereof, as indicated. It has also been found that smaller proportions of borax, for example as low as about 2 percent, on the indicated basis, produces a hydrophobic surface, but one which becomes hygroscopic after it has been submitted to relatively high humidity and temperature for a comparatively short period of time. Therefore, while beads in accordance with the invention can be produced from mixtures containing, broadly, from about 2 percent to about 15 percent of borax, it is preferred that such admixtures contain from about 8 percent to about 10 percent thereof.

The terms "percent" and "parts," as used herein and in the appended claims, refer to percent and parts by weight, unless otherwise indicated.

When materials other than borax, as suggested above, are employed to produce glass beads having a hydrophobic surface, the amount or amounts thereof used should be such as to introduce an amount of boron equal to that which would be introduced by borax in the indicated proportions.

As is subsequently discussed with reference to the attached drawings, the mixture of borax or other similar material and glass cullet can be spheroidized in the manner explained in Searight Patent 2,730,841, and could be silicone-coated in the manner there described. However, the coating, which is believed to be a borosilicate, formed by virtue of reaction between borax, for example, and soda lime glass cullet makes the bead surfaces hydrophobic, and therefore eliminates the need for the silicone coating.

Referring now to the drawings, and especially to Fig. 1, apparatus in which irregular shapes of powdered glass in intimate association with a reaction product of an alkali metal compound and a boron acid can be formed into glass beads is shown. The apparatus comprises a stack indicated generally at 11 made up of a plurality of superposed tubular sections 12, and suitably mounted on a frame member indicated generally at 13, which constitutes no part of the instant invention. The stack 11 is shown as extending through the peak portion of a covering roof 14.

The stack 11 is encircled by an air shaft 15, also mounted on the frame portion 13. Air is supplied to the space between the air shaft 15 and the stack 11 by a blower 16 having an outlet conduit 17 from which conduits 18, 19 and 20 lead air to the space between the shaft 15 and the stack 11.

The stack 11 at its upper end extends above the upper end of the air shaft 15 and enters the bottom of a casing 21 forming an expansion chamber 22.

Projecting into the lower end of the stack 11 is a burner 23 of a type commonly used in apparatus of this character. The burner 23 is supplied with a mixture of gas and air from a blower 24 through a conduit 25. Powdered glass in desired quantity, and intimately associated with a reaction product of an alkali metal compound and a boron acid, as described, is supplied to the conduit 25 from a hopper 26 (see Fig. 2) through a conduit 27 that enters the conduit 25 adjacent the bottom of the burner. The feed of the glass through the conduit 27 is induced by a worm 28 suitably driven in any desired manner (not illustrated). In operation, the combustible gas mixture and the powdered glass in intimate association with the reaction product are discharged by the burner 23 up into the lower end of the stack 11. Combustion takes place above the burner. The powdered glass, as it passes through the stack with the hot products of combustion, is melted and formed into beads, and the alkali metal-boron acid reaction product forms, with the softened glass, a surface coating which is different in composition and in characteristics from the interior portion of the bead. Auxiliary air from the blower 16 cools the stack wall below the temperature it would otherwise assume by virtue of the passage therethrough of the hot gases, and minimizes the tendency of the melted glass to collect on the inner wall of the stack. As the gases are discharged from the stack 11 into the chamber 22 they expand and travel at a lower velocity, so that the entrained beads fall out and are deposited on the conical bottom of the chamber. The beads thus deposited roll to the bottom of the chamber, and are collected therefrom in any suitable manner (not illustrated), either continuously or periodically.

Glass cullet other than soda lime cullet can also be employed in the production of beads and may often be preferred, particularly where, as is often the case, a comparatively high refractive index is desired for the finished beads. For example, high lead glasses can be employed, as well as other known glasses of high refractive index, or other glasses having particular properties desired for a special application. It will be apparent that other changes and modifications can also be made without departing from the spirit and scope of the attached claims.

What I claim is:

1. In a method for producing glass beads which comprises introducing irregular shapes of powdered glass into a stream of gases containing oxygen and a combustible compound, and moving at a velocity sufficient that the glass is carried by the gases into a combustion zone where the combustible compound is burned, the glass is fused and assumes a generally spherical shape, and products of combustion carry the spheroidized glass into a settling zone of greater diameter than the combustion zone, discharging products of combustion from the settling zone, and removing glass beads from the bottom of the settling zone, the improvement which comprises introducing into the stream of gases irregular shapes of powdered glass in intimate association with a reaction product of an alkali metal compound and a boron acid.

2. In a method for producing glass beads which comprises introducing irregular shapes of powdered glass into a stream of gases containing oxygen and a combustible compound, and moving at a velocity sufficient that the glass is carried by the gases into a combustion zone where the combustible compound is burned, the glass is fused and assumes a generally spherical shape, and products of combustion carry the spheroidized glass into a settling zone of greater diameter than the combustion zone, discharging products of combustion from the settling zone, and removing glass beads from the bottom of the settling zone, the improvement which comprises introducing into the stream of gases irregular shapes of powdered glass in intimate association with an alkali metal borate.

3. In a method for producing glass beads which comprises introducing irregular shapes of powdered glass into a stream of gases containing oxygen and a combustible compound, and moving at a velocity sufficient that the glass is carried by the gases into a combustion zone where the combustible compound is burned, the glass is fused and assumes a generally spherical shape, and products of combustion carry the spheroidized glass into a settling zone of greater diameter than the combustion zone, discharging products of combustion from the settling zone, and removing glass beads from the bottom of the settling zone, the improvement which comprises introducing into the stream of gases irregular shapes of powdered glass in intimate association with an alkali metal tetraborate.

4. In a method for producing glass beads which comprises introducing irregular shapes of powdered glass into a stream of gases containing oxygen and a combustible compound, and moving at a velocity sufficient that the glass is carried by the gases into a combustion zone where the combustible compound is burned, the glass is fused and assumes a generally spherical shape, and products of combustion carry the spheroidized glass into a settling zone of greater diameter than the combustion zone, discharging products of combustion from the settling zone, and removing glass beads from the bottom of the settling zone, the improvement which comprises introducing into the stream of gases irregular shapes of powdered glass in intimate association with a sodium tetraborate.

5. In a method for producing glass beads which comprises introducing irregular shapes of powdered glass into a stream of gases containing oxygen and a combustible compound, and moving at a velocity sufficient that the glass is carried by the gases into a combustion zone where the combustible compound is burned, the glass is fused and assumes a generally spherical shape, and products of combustion carry the spheroidized glass into a settling zone of greater diameter than the combustion zone, discharging products of combustion from the settling zone, and removing glass beads from the bottom of the settling zone, the improvement which comprises introducing into the stream of gases irregular shapes of powdered glass in intimate association with sodium tetraborate decahydrate.

6. In a method for producing glass beads which comprises introducing irregular shapes of powdered glass into a stream of gases containing oxygen and a combustible compound, and moving at a velocity sufficient that the glass is carried by the gases into a combustion zone where the combustible compound is burned, the glass is fused and assumes a generally spherical shape, and products of combustion carry the spheroidized glass into a settling zone of greater diameter than the combustion zone, discharging products of combustion from the settling zone, and removing glass beads from the bottom of the settling zone, the improvement which comprises introducing into the stream of gases irregular shapes of powdered glass in intimate association with from 2 percent to 15 percent of sodium tetraboratedecahydrate, based upon the weight of powdered glass.

7. In a method for producing glass beads which comprises introducing irregular shapes of powdered glass into a stream of gases containing oxygen and a combustible compound, and moving at a velocity sufficient that the glass is carried by the gases into a combustion zone where the combustible compound is burned, the glass is fused and assumes a generally spherical shape, and products of combustion carry the spheroidized glass into a settling zone of greater diameter than the combustion zone, discharging products of combustion from the settling zone, and removing glass beads from the bottom of the settling zone, the improvement which comprises introducing into the stream of gases irregular shapes of powdered glass in intimate association with from 8 percent to 10 percent of sodium tetraboratedecahydrate, based upon the weight of powdered glass.

References Cited in the file of this patent

UNITED STATES PATENTS

| | | |
|---|---|---|
| 1,156,163 | Locke | Oct. 12, 1915 |
| 1,565,598 | Sproesser | Dec. 15, 1925 |
| 1,907,076 | Martin | May 2, 1933 |
| 2,038,691 | Taylor | Apr. 28, 1936 |
| 2,065,852 | Dalton | Dec. 29, 1936 |
| 2,119,970 | Smith | June 7, 1938 |
| 2,238,777 | Lemmers | Apr. 15, 1941 |
| 2,610,922 | Beck | Sept. 16, 1952 |
| 2,619,776 | Potters | Dec. 2, 1952 |
| 2,730,841 | Searight | Jan. 17, 1956 |